United States Patent
Downey et al.

[19]

[11] Patent Number: 6,036,267
[45] Date of Patent: Mar. 14, 2000

[54] SEAT TRACK WITH ROTARY LOCKING DEVICE

[75] Inventors: Hugh D. Downey, Barrie; Pascal Garrido, Gravenhurst, both of Canada

[73] Assignee: Dura Automotive Systems Inc., Rochester Hills, Mich.

[21] Appl. No.: 09/103,029

[22] Filed: Jun. 23, 1998

[51] Int. Cl.⁷ .................................................. A47C 1/023
[52] U.S. Cl. ..................... 297/341; 297/344.1; 248/429
[58] Field of Search ............................... 297/34.1, 344.1; 248/429, 436

[56] References Cited

U.S. PATENT DOCUMENTS

| | | | |
|---|---|---|---|
| 3,940,182 | 2/1976 | Tamura | 297/341 |
| 4,572,469 | 2/1986 | Rees | 297/341 |
| 4,642,983 | 5/1988 | Nihei | 297/341 |
| 4,666,208 | 5/1987 | Tatematsu et al. | 297/341 |
| 4,961,559 | 10/1990 | Raymor | 248/429 |
| 5,605,377 | 2/1997 | Tame | 297/341 |
| 5,740,999 | 4/1998 | Yamada | 297/341 |
| 5,785,291 | 7/1998 | Chang | 297/341 |

*Primary Examiner*—Anthony D. Barfield
*Attorney, Agent, or Firm*—Robert Kelley Roth

[57] ABSTRACT

A vehicle seat assembly includes a seat back supported with respect to a seat bottom and is attached to the vehicle by a mounting assembly. The mounting assembly includes a locking device rotatably mounted on an upper track that moves relative to a lower track. The locking device includes at least one locking tooth that engages one or more slots on the lower track so that the upper track and the seat are maintained in a fixed position relative to the lower track. The mounting assembly includes a release member for disengaging the locking device and adjusting the position of the seat. The release member is rotatably supported on the second track and selectively moves into a release position when actuated by a substantially vertical force. This causes the locking device to rotate out of the locked position and into the unlocked position such that the second track can move relative to the first track allowing the seat position to be adjusted.

19 Claims, 5 Drawing Sheets

SEAT TRACK WITH ROTARY LOCKING DEVICE

BACKGROUND OF THE INVENTION

This application relates generally to an assembly for mounting a seat within a vehicle. More particularly, this invention relates to a seat mounting assembly with a locking device, moveable between a locked and unlocked position by a release member, which is vertically actuated by an actuation member.

Seat track arrangements for mounting seats within vehicles are generally well known. Most arrangements provide for a seat to be moved or adjusted in forward and rearward directions within a vehicle.

In many circumstances, it is desirable to have seats within a vehicle that include a seat back that is supported on a seat bottom such that the seat bottom can be adjusted forwardly or rearwardly. Such an arrangement is necessary, for example, to accommodate vehicle drivers that are of varying heights. It is also desirable for a seat to have the capability to be slid forward to allow easier access to an area behind the seat.

Mounting assemblies that are used to mount the seat to the vehicle are often complex, especially when the mounting assembly includes the dual capability of being able to adjust the seat in forward and rearward directions and being able to slide the seat forward when the seat back is pivoted toward the seat bottom. These complex mounting assemblies require a great number of components which increases the assembly time and the overall cost of the seat assembly.

Accordingly, it is desirable to provide a simplified and inexpensive seat mounting assembly that includes rearward and forward seat adjustment capability, which can optionally be slid forwardly when the seat back is pivoted downwardly. It is also desirable for the mounting assembly to be durable, easy to operate, and quiet.

SUMMARY OF THE INVENTION

In general terms, this invention is a vehicle seat assembly with a seat back supported with respect to a seat bottom, and which is attached to the vehicle by a mounting assembly. A first track is attached to the vehicle and a second track is supported on the first track such that the second track can move forwardly and rearwardly with respect to the first track. The mounting assembly includes a locking device mounted on the second track. The locking device includes one or more locking teeth that engage one or more slots on the first track so that the second track and the seat are maintained in a fixed position relative to the first track when the locking device is in a locked position. The locking device includes a release member for disengaging the locking device and adjusting the position of the seat.

In a preferred embodiment of this invention, the assembly for mounting a seat within a vehicle includes a first track, a second track supported for movement relative to the first track, and a locking device supported on the second track and moveable between a locked position and an unlocked position. In the locked position the locking device maintains the second track in a desired position while in the unlocked position the second track is movable relative to the first track. The assembly further includes a release member that selectively moves into a release position to move the locking device out of the locked position and maintain the locking device in the unlocked position such that the second track can move relative to the first track. The release member is rotatably supported on the second track for moving the locking device between the locked and unlocked positions.

The subject invention offers several advantages over prior art systems because it provides a simplified mounting for a seat within a vehicle that is durable, easy to assemble, and quiet in operation.

These and other features and advantages of the present invention will be best understood from the following specification and drawings, the following of which is a brief description.

DETAILED DESCRIPTION OF THE PREFERRED EMBODIMENT

Figure 1:
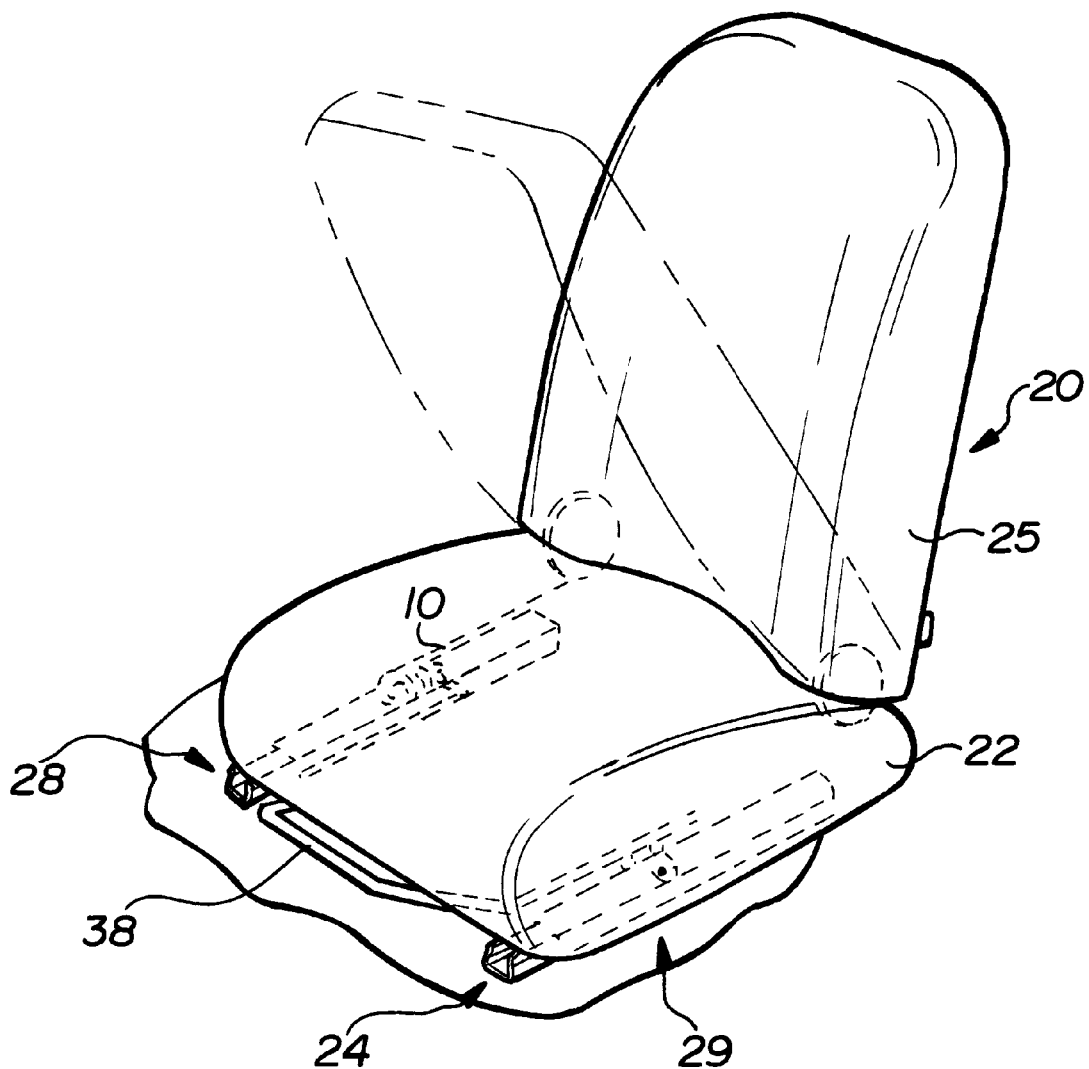
FIG. 1 is a perspective illustration of a seat with a seat track mounting assembly designed according to this invention.

FIG. 1 illustrates a vehicle seat assembly 20. The seat assembly 20 includes a seat bottom 22 that is mounted within the vehicle on a mounting assembly 24. A seat back 26 is supported for movement relative to the seat bottom 22. The seat back 26 is preferably pivotally mounted with respect to the seat bottom 22 so that the seat back 26 can be folded downwardly with respect to the seat bottom 22, as indicated in phantom in FIG. 1. In this preferred embodiment, a cable or other control member 10 operably connects the seat back 26 to the mounting assembly 24.

The mounting assembly 24 includes track assemblies on an inboard side 28 and an outboard side 29 of the seat assembly. A handle or towel bar 38, accessible by a seat occupant, is operably connected to both the inboard and outboard track assemblies. The terms inboard and outboard are used in this description for clarity and illustration purposes only and cannot be considered limiting.

Figure 2:
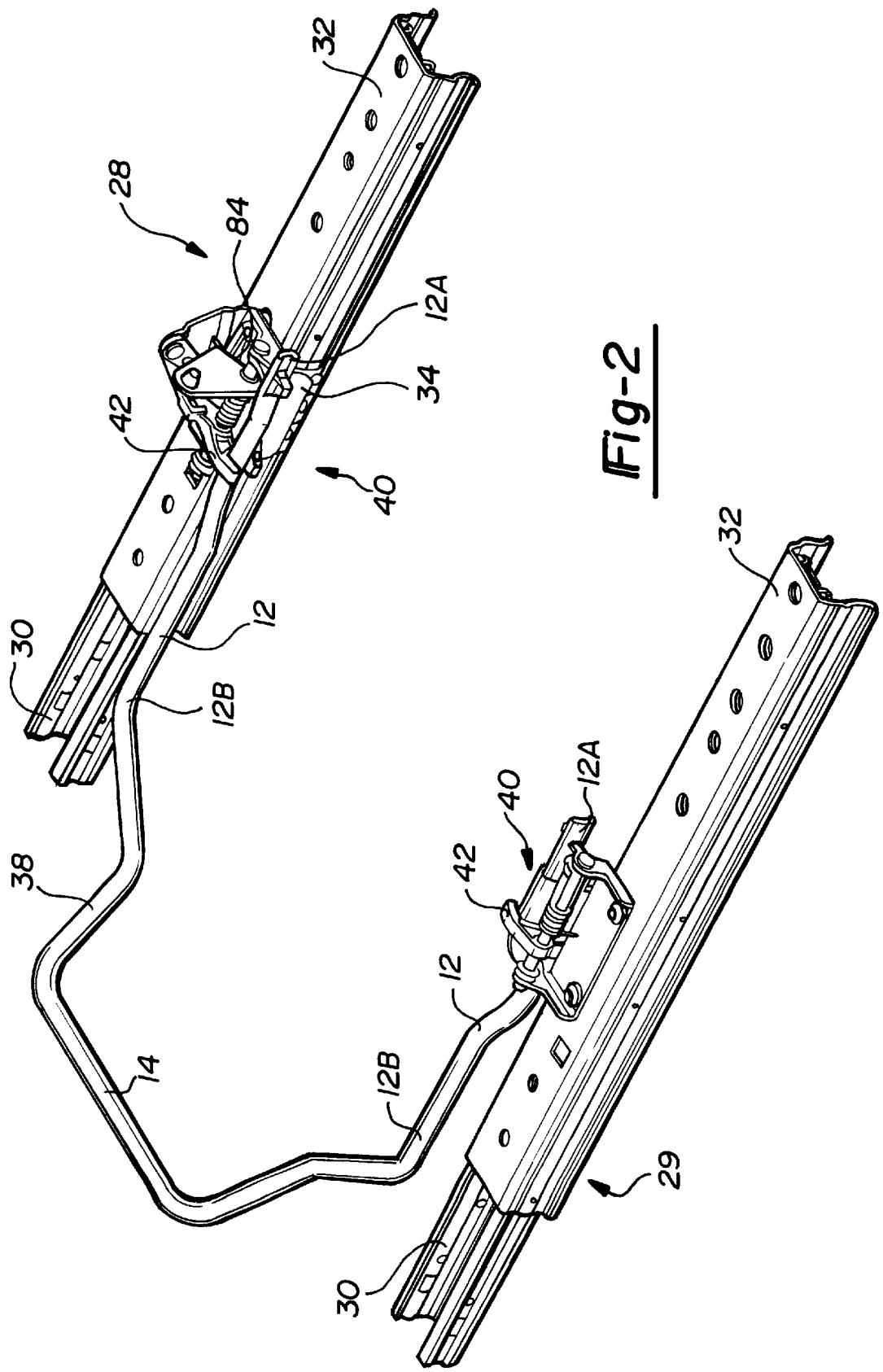
FIG. 2 is an enlarged perspective view of the seat track mounting assembly shown in FIG. 1.

As shown in FIG. 2, the towel bar 38 is a generally C-shaped member with two leg portions 12 interconnected by a central portion 14. The leg portions 12 are connected to locking assemblies 40 located on the inboard 28 and outboard 29 sides. The central portion 14 is adjacent to the front of the seat bottom 22 and serves as the handle that is actuated by a seat occupant. When the central portion 14 is lifted upwardly toward the seat bottom 22, the leg portions 12 move the locking assemblies 40 from the locked position to the unlocked position and thus, allow the seat 20 to be adjusted forwardly or rearwardly.

Each side of the mounting assembly 24 includes a first track 30 and a second track 32. Preferably, the first track 30 is a lower track 30 that is fixedly mounted to a frame of the vehicle, for example. The second track 32 is preferably an upper track 32 that is received over the lower track 30 so that the upper track 32 can be moved in a forward or rearward direction relative to the lower track 30. The terms forward, rearward, upper, and lower, as used in this description, are for illustration purposes only and cannot be considered limiting. The profiles of the lower track 30 and the upper track 32 ensure that the upper track 32 only moves along a longitudinal axis of the tracks and does not move in other directions.

The locking assembly 40 on the inboard side 28 of the vehicle includes a locking device or locking pawl 34 that is supported on the upper track 32. The locking assembly 40 on the outboard side 29 also includes a locking pawl 34 that is supported on the upper track 32. The towel bar 38 is accessible by the seat occupant from the front of the seat 20 to disengage the locking pawls 34 so that the position of the seat 20 can be adjusted. In one embodiment, the towel bar 38 only acts directly upon one of the locking assemblies 40 and a connector bar or cable is provided so that the other locking device 40 is also actuated upon manipulation of the towel bar 38. Thus in this embodiment, the locking assemblies would be similar but not identical to each other. However, in the preferred embodiment the handle 38 acts upon both locking assemblies 40 so that both locking assemblies 40 would be substantially identical to each other. Also, the locking assemblies 40 can be used to actuate a memory block for an easy entry seat with a memory function. The memory block allows the seat to be returned to its original position after it has been slid forward. It should be understood that the locking assembly 40 of the subject invention can be used in any of these embodiments.

Also, in another alternate embodiment, a rod or lever can be used to actuate one of the release members on either the inboard 28 or outboard 29 sides, instead of having a towel bar 38 connected to both release members on both the inboard 28 and outboard 29 sides. As discussed in detail above, a slave member can operably connect the locking pawl 34 on the side of the seat with the lever to the locking pawl 34 opposite side. When the release member is actuated to rotate the locking pawl 34 into the unlocked position the slave member is positions the other locking pawl 34 in the unlocked position so that the upper track 32 can move relative to the lower track 30. The slave member is preferably a control cable, however, a rod or spring member could also be used, for example.

The locking assemblies 40 each include a release member 42 which is supported on the upper track 32. The towel bar 38 is partially supported by the release members 42 which are used to rotate the locking pawls 34 between the locked or engaged position and the unlocked or disengaged position. The leg portions 12 of the towel bar 38 include a first end 12A and a second end 12B. The first end 12A is pivotally fixed with respect to the upper track 32 so that it cannot move vertically with respect to the upper track 32. The second end 12B, opposite from the first end 12A is able to move vertically with respect to the upper track 32 using the first end 12A as the pivot point.

Figure 3:
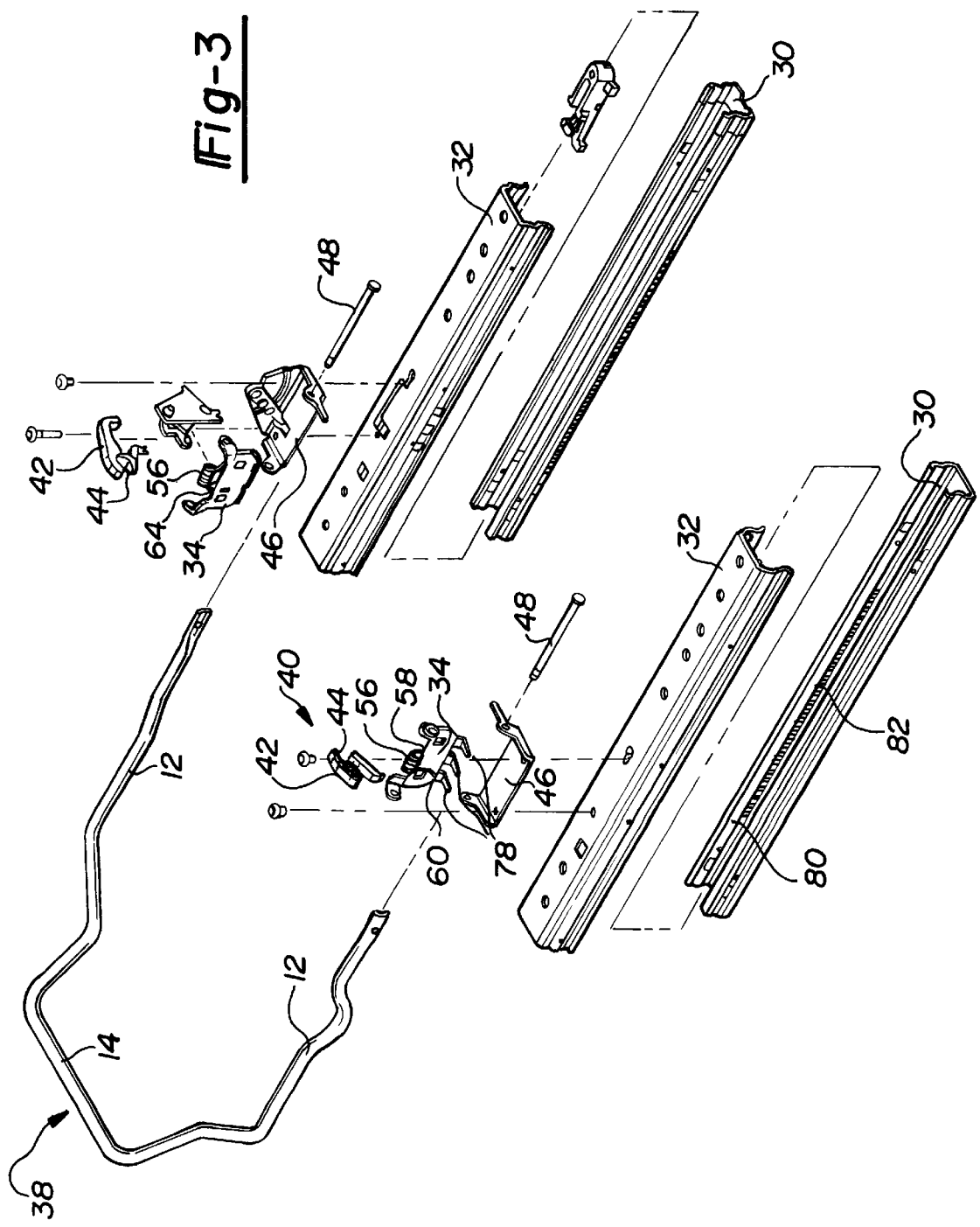
FIG. 3 is an enlarged, perspective, exploded view of the seat track mounting assembly shown in FIG. 2.

The locking assemblies 40 are shown in greater detail in the exploded view of the seat track mounting assembly shown in FIG. 3. The locking assembly 40 includes a locking pawl 34 supported on the upper track 32 and moveable between the locked position where the upper track 32 is maintained in a desired position and the unlocked position where the upper track 32 is movable relative to the first track 30. The release member 42 selectively moves into a release position which causes the locking pawl 34 to move out of the locked position. The release member 42 includes an actuation portion 44 that engages the towel bar 38 for moving the locking pawl 34 between the locked and unlocked positions.

A mounting bracket 46 mounts the locking pawl 34 and the release member 42 to the upper track 32. The locking pawl 34 is connected to the mounting bracket 46 with at least one pivot pin 48 such that the locking pawl 34 rotates about pivot pin 48 between the locked and unlocked positions. In the preferred embodiment, a single pivot pin 48 is used to mount the locking device 40 to the mounting bracket 46, however, more than one pivot pin 48 could be used.

The locking assembly 40 includes a resilient member 56 for resiliently connecting the locking pawl 34 and the mounting bracket 46 and/or upper track 32. The resilient member 56 preferably includes a first end 58 connected to the locking pawl 34 and a second end 60 connected to the mounting bracket 46 or other support structure. The first end 58 is preferably held on the locking device 40 by a tab extension 64 extending upwardly from the locking member 40, however, other retention methods well known in the art can be used. The second end 60 is also secured to the mounting bracket 46 or the upper track 32 by retention methods well known in the art.

Figure 4:
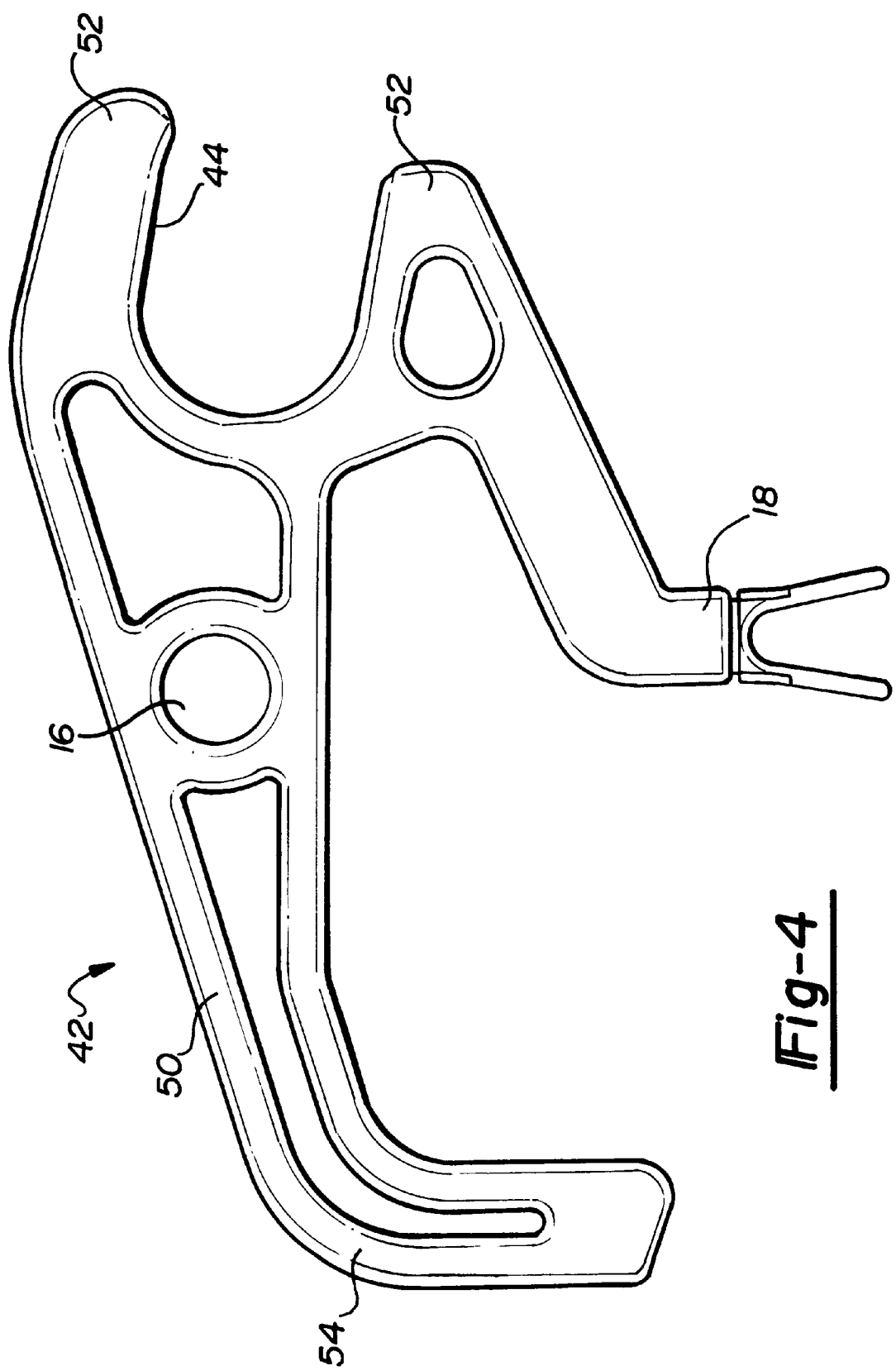
FIG. 4 is an enlarged side view of the release member shown in FIG. 3.

The release member 42 is also rotatably connected to the mounting bracket 46 via pivot pin 48 such that the release member 42 is able to rotate with respect to the upper track 32. As shown in FIG. 4, the release member 42 includes a longitudinal body portion 50, a pair of arms 52, an elongated leg portion 54, and a transverse leg portion 18 extending substantially vertically to said the body portion 50. The pair of arms are shaped to receive a portion of the towel bar 38.

The release member 42 also includes an aperture 16 for receiving pivot pin 48. The aperture 16 is preferably located between the pair of arms 52 and the elongated leg potion 54. When the actuation member or towel bar 38 is lifted upwardly toward the seat bottom 22 it exerts a generally vertical actuating force on the actuation portion 44 of the release member 42 causing the release member 42 to rotate about pivot pin 48. As the release member 42 rotates, it causes the locking pawl 34 to also rotate about the pivot pin 48 at the same time. As the locking pawl 34 rotates, it moves from the locked position to the unlocked position allowing the seat 20 to be adjusted.

Figure 5:
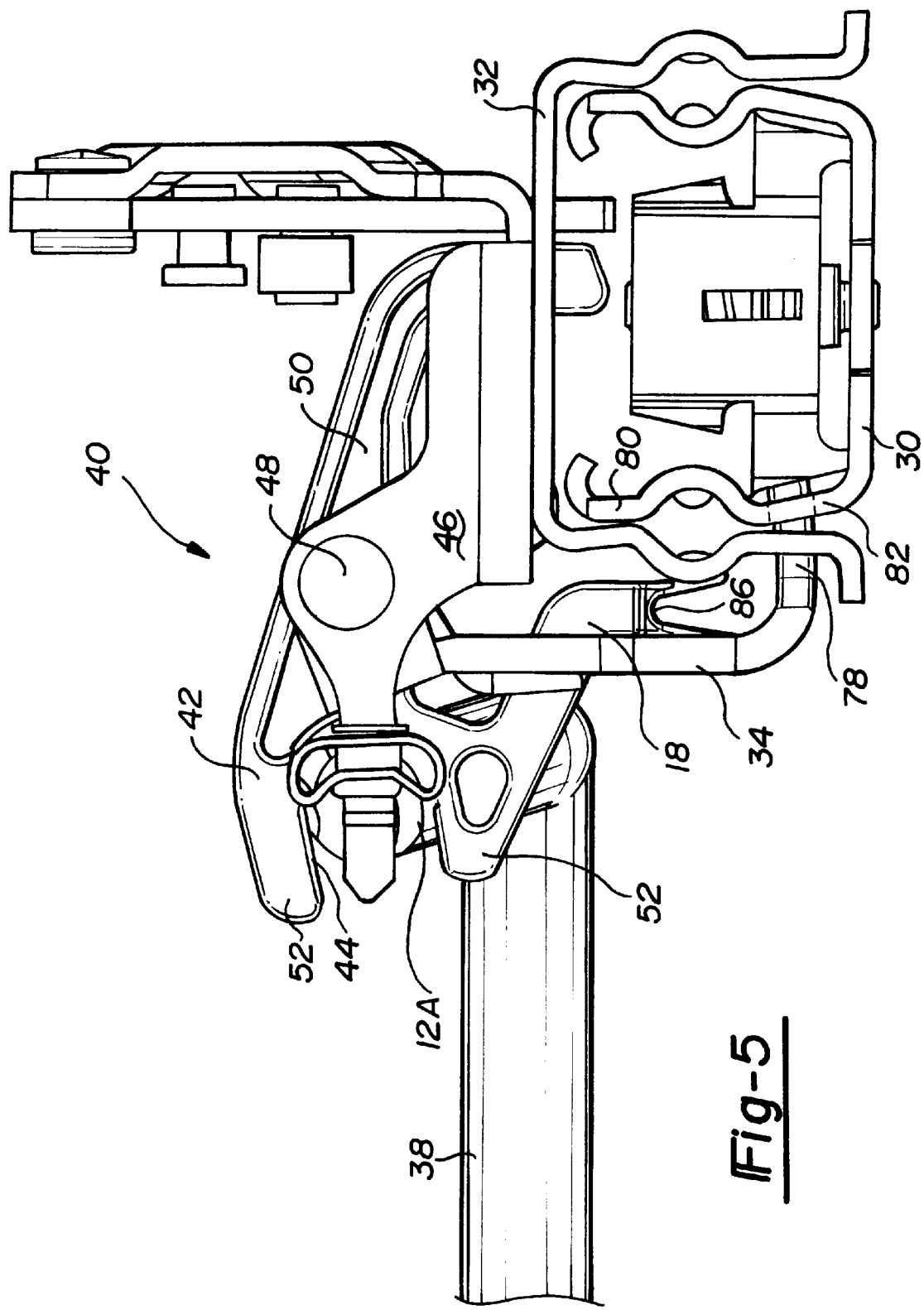
FIG. 5 is an end view of the seat track mounting assembly.

The transverse leg potion 18 of the release member 42 is shown in more detail in FIG. 5. The transverse leg portion 18 extends through the locking pawl 34 such that the distal end 86 engages the locking pawl 34. When the towel bar 38 exerts a vertical force on the actuation portion 44 of the release member 42, the transverse leg portion 18 is pressed against the locking pawl 34 causing it to rotate about pivot pin 48.

The seat 20 also preferably includes a second control function where the seat 20 can slide forward when the seat back 26 is pivoted downwardly toward the seat bottom 22. This second control function uses a second release member 84 to move the locking pawl 34 from the locked to the unlocked position independently from the first release member 42.

In one embodiment, a cable or other control member 10, shown in FIG. 1, is operably connected to the second release member 84 for selectively moving the release member 84 into the release position. The control member 10 is also preferably operatively connected to the seat back 26 and as the seat back 26 is pivoted downwardly toward the seat bottom 22 the control member 10 is positioned such that it actuates release member 84. While the control member 10 preferably is responsive to pivotal movement of the seat back 26 it could also be responsive to other input actuating members such as a handle, rod, or actuation button. The control member 10 applies a force on the release member 84 such that the release member 84 engages the locking pawl 34 and moves it out of the locked position and into the unlocked position. Thus, the second release member 84 applies a force against the locking pawl 34 to rotate the locking pawl 34 about pivot pin 48 and move the assembly 34 out of the locked position and into the unlocked position independently from the towel bar actuation member 38.

The locking device 40 includes one or more locking pawls or teeth 78, seen more clearly in FIG. 3, and the lower track 30 includes a sidewall 80 having a plurality of slots 82. At least one tooth 78 is received in one of the slots 82 when the locking device 40 is in the locked position. The teeth 78 are disengaged from the slots 82 when either the handle 38 or the release member 84 moves the locking pawl 34 to the unlocked position.

The resilient member 56 is preferably a coil spring having a predetermined spring force that biases the locking pawl 34 in the locked position. The release member 42 moves into the release position and the locking pawl 34 moves into the unlocked position when the vertical actuating force applied to the release member 42 overcomes the predetermined spring force. As the release member 42 rotates causing the locking pawl 34 to rotate, the spring member 56 is extended such that when the release member 42 is caused to rotate back to its original position, the spring member 56 recoils, thus assisting the return of the release member 42. Thus, a vertical force against the release member 42 is translated into a rotation movement of the teeth 78.

In summary, the vehicle seat assembly 20 includes a seat back 26 supported with respect to a seat bottom 22 and is attached to the vehicle by a mounting assembly 24. The seat assembly preferably includes two control functions. A seat occupant can adjust the seat 20 rearwardly or forwardly to a desired location by actuating a towel bar 38 or other actuation member or lever. The seat back 26 can also be pivoted downwardly toward the seat bottom 22 and the entire seat 20 can then be slid forward along the lower track 30 to facilitate access to a rear area behind the seat.

The mounting assembly 24 includes a locking assembly 40 with a locking pawl 34 mounted on an upper track 32 that moves relative to a lower track 30. The locking pawl 34 includes at least one tooth 78 that engages one or more slots 82 on the lower track 30 so that the upper track 32 and the seat 20 are maintained in a fixed position relative to the lower track 30. In the preferred embodiment, the locking assembly 40 includes a first release member 42 operably connected to a towel bar 38 for disengaging the locking device 40 and allowing adjustment of the position of the seat 20. The locking assembly 40 also preferably includes a second release member 84 which is responsive to movement of the seat back 26 with respect to the seat bottom 22 or is responsive to another actuation member such as a rod or handle. The second release member 84 engages the locking pawl 34 causing it to move from an locked position to an unlocked position. This causes the upper track 32 and the seat 20 to move with respect to the lower track 30, thus allowing the seat 20 to be slid forward.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An assembly for mounting a seat within a vehicle comprising:

a first track;

a second track supported for movement relative to said first track;

a locking device supported for rotation about said second track and moveable between a locked position where said locking device maintains said second track in a desired position and an unlocked position where said second track is movable relative to said first track; and a release member that selectively moves into a release position to move said locking device out of said locked position and maintain said locking device in said unlocked position such that said second track can move relative to said first track wherein said release member includes a main body portion rotatably supported on a pivot pin, an actuation portion for receiving a substantially vertical actuating force, and a transversely extending leg portion for engaging said locking device to move said locking device between said locked and unlocked positions, said release member rotating said locking device from said locked position to said unlocked position when actuated by said vertical actuating force.

2. An assembly as recited in claim 1 wherein said pivot pin rotatably mounts said locking device on said second track.

3. An assembly as recited in claim 2 wherein said release member and said locking member simultaneously rotate about said common pivot pin when said leg portion of said release member is actuated against said locking device.

4. An assembly as recited in claim 3 including a resilient member connecting said locking device to said second track wherein said resilient member has a predetermined resilient force for biasing said locking device in the locked position when said release member is not in said release position.

5. An assembly as recited in claim 4 wherein said release member moves into said release position and said locking device moves into said unlocked position when said vertical actuating force is greater than said predetermined resilient force.

6. An assembly as recited in claim 1 including a mounting bracket for mounting said locking device and said release member to said second track.

7. An assembly as recited in claim 6 wherein said locking device is connected to said mounting bracket by said pivot pin such that said locking device rotates about said second track when said release member moves said locking device between said locked and unlocked positions.

8. An assembly as recited in claim 7 wherein said release member is rotatably supported on said pivot pin such that said release member rotates about said second track when said release member is actuated.

9. An assembly for mounting a seat within a vehicle comprising:

a first track;

a second track supported for movement relative to said first track;

a locking device supported on said second track and moveable between a locked position where said locking device maintains said second track in a desired position and an unlocked position where said second track is movable relative to said first track; and a release member rotatably mounted to said second track that selectively moves said locking device out of said locked position such that said second track can move relative to said first track wherein said release member includes a main body having an actuation portion and a transversely extending leg portion such that when said actuation portion receives a substantially vertical force, said leg portion engages said locking device causing said locking device to rotate about said second track to move said locking device from said locked position to said unlocked position.

10. An assembly as recited in claim 9 including an actuation member wherein said actuation portion of said release member includes a pair of arms for receiving said actuation member.

11. An assembly as recited in claim 10 wherein said actuation member includes a first portion and a second portion, said first portion being pivotally fixed to said second track and said second portion being moveable in a substantially vertical direction with respect to said second track.

12. An assembly as recited in claim 11 wherein said leg portion extends in a direction opposite from said pair of arms and wherein said release member is rotatably supported on a pivot pin at a point between said pair of arms and said leg portion.

13. An assembly as recited in claim 9 including at least one mounting bracket for mounting said locking device and said release member to said second track.

14. An assembly as recited in claim 13 wherein said locking device and said release member are connected to said mounting bracket by a single pivot pin such that said locking device and said release member simultaneously rotate about said second track when said release member moves said locking device between said locked and unlocked positions.

15. An assembly as recited in claim 14 including a resilient member having a predetermined spring force for biasing said locking device in said locked position such that said release member moves said locking device out of said locked position when said vertical force is greater than said predetermined spring force.

16. A vehicle seat assembly comprising a seat bottom;

a seat back pivotally supported for movement relative to said seat bottom;

a first track;

a second track supported for movement relative to said first track, said seat bottom being supported on said second track for movement with said second track;

a locking device supported for rotation about said second track by a pivot pin for movement into and out of a locked position where said locking device maintains said second track in a selected position relative to said first track when in said locked position;

a first release member supported on said pivot pin for rotation about said second track and including a main body portion with a transversely extending leg for selectively engaging said locking device to move said locking device into and out of said locked position; and a first actuation member moveable between a rest position where the second track does not move with respect to said first track and an actuated position where said second track does move with respect to said first track, said first actuation member for supplying a substantially vertical actuating force to said first release member wherein said vertical actuating force causes said first release member to rotate about said pivot pin with said first release member rotating said locking device from said locked position to said unlocked position.

17. An assembly as recited in claim 16 including a second release member operatively coupled to said seat back and supported on said second track, said second release member being responsive to movement of a second actuation member wherein said second release member engages said locking device causing said locking device to move in and out of said locked position independently from said first release member.

18. A seat assembly as recited in claim 16 including a resilient member for resiliently biasing said locked device in said locked position when said first actuation member is in said rest position.

19. A vehicle seat assembly comprising a seat bottom;

a seat back pivotally supported for movement relative to said seat bottom;

a first track;

a second track supported for movement relative to said first track, said seat bottom being supported on said second track for movement with said second track;

a locking device rotatable supported on said second track by a pivot pin for movement into and out of a locked position where said locking device maintains said second track in a selected position relative to said first track when in said locked position;:

a first release member rotatably supported on said second track by said pivot pin for selectively moving said locking device into and out of said locked position; and a first actuation member moveable between a rest position where the second track does not move with respect to said first track and an actuated position where said second track does move with respect to said first track, said first actuation member for supplying a substantially vertical actuating force to said first release member wherein said vertical actuating force causes said first release member to rotate about said pivot pin with said first release member rotating said locking device from said locked position to said unlocked position and wherein said first release member includes a longitudinal body portion with pair of arms for receiving said first actuation member and a leg portion extending substantially vertically to said body portion, said leg portion engaging said locking device as said first actuation member is moved from said rest position to said actuated position.

* * * * *